United States Patent
Barriuso et al.

(10) Patent No.: US 6,935,001 B2
(45) Date of Patent: Aug. 30, 2005

(54) TIE

(75) Inventors: Jean-Pierre Barriuso, Bosc Roger sur Buchy (FR); Hervé Cornu, Houppeville (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 10/292,762

(22) Filed: Nov. 13, 2002

(65) Prior Publication Data
US 2003/0088949 A1 May 15, 2003

(30) Foreign Application Priority Data
Nov. 13, 2001 (FR) .............................................. 01 14642

(51) Int. Cl.⁷ .............................................. B65D 63/10
(52) U.S. Cl. .................. 24/17 AP; 24/16 PB; 24/17 B; 24/30.5 P
(58) Field of Search .............................. 24/16 PB, 16 R, 24/17 AP, 17 B, 3.4, 30.5 P; 47/47; 119/865; 248/74.3

(56) References Cited

U.S. PATENT DOCUMENTS

| 3,875,620 A | | 4/1975 | Wells et al. |
| 4,235,404 A | * | 11/1980 | Kraus ......................... 248/74.3 |
| 4,377,872 A | * | 3/1983 | Daniell, Jr. ............... 24/16 PB |
| 5,799,376 A | | 9/1998 | Harsley |
| 5,878,465 A | * | 3/1999 | Jenner ....................... 24/16 PB |
| 6,449,808 B1 | * | 9/2002 | Zappa et al. ............... 24/16 PB |

FOREIGN PATENT DOCUMENTS

| DE | 32 05 045 A1 | 9/1983 |
| EP | 0 389 831 | 10/1990 |
| EP | 0 632 222 A1 | 1/1995 |
| EP | 1 103 750 A1 | 5/2001 |

* cited by examiner

Primary Examiner—Jack W. Lavinder
(74) Attorney, Agent, or Firm—Young & Thompson

(57) ABSTRACT

A tie includes a strap having two end segments connected by an extensible intermediate portion provided with a succession of frangible bridges each connecting a first part of the intermediate portion to a second part of the intermediate portion. Two or more of the frangible bridges have different sections.

18 Claims, 3 Drawing Sheets

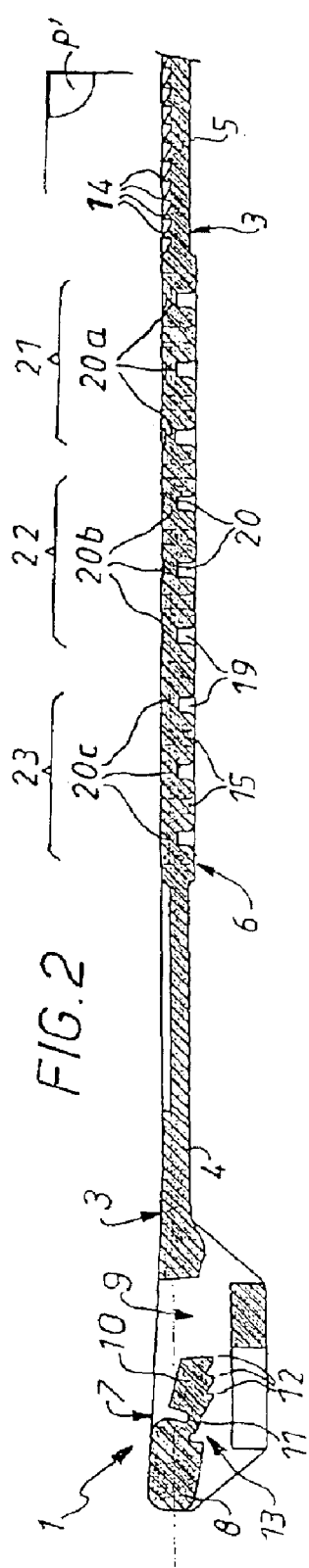
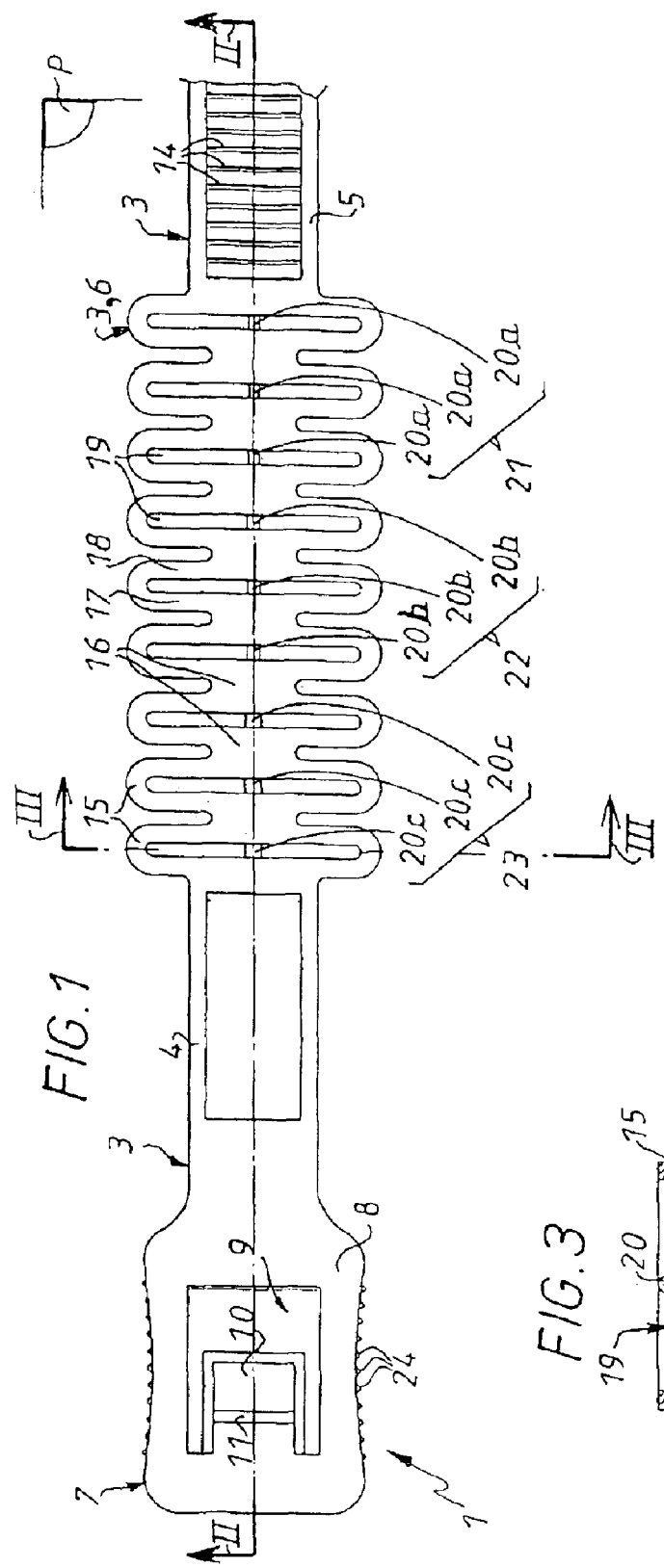
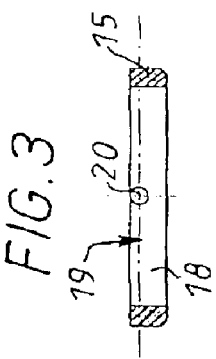

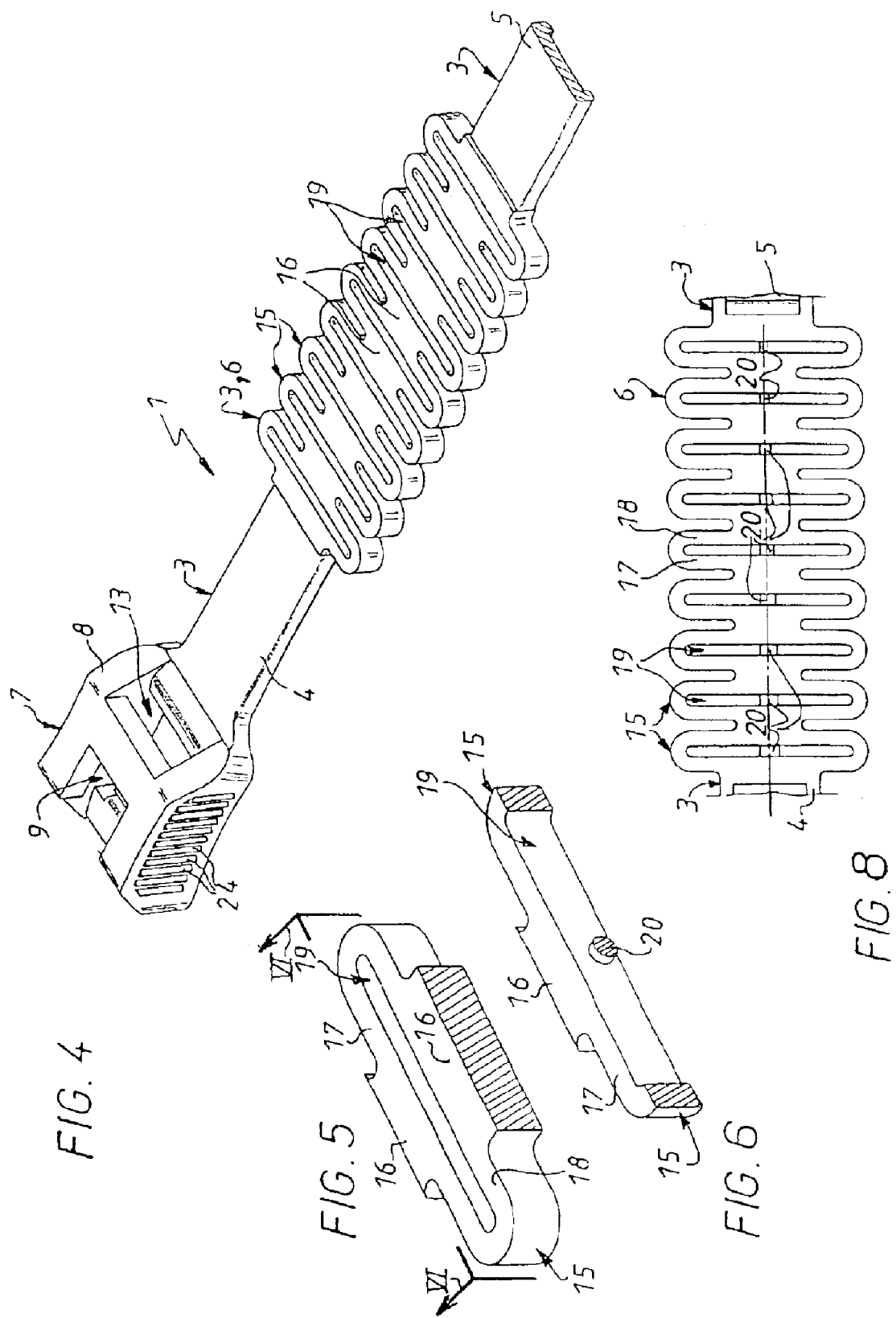

TIE

BACKGROUND OF THE INVENTION

1. Field of the Invention

The invention relates to ties.

It concerns a tie including a strap having two end segments connected by an extensible intermediate portion provided with a succession of frangible bridges each connecting a first part of said portion to a second part of said portion.

2. Description of the Prior Art

U.S. Pat. No. 3,875,620 shows the application of a tie of the above kind to attaching the branches of a tree or a shrub to a support.

The tie expands progressively as the branch grows by successive rupturing of the frangible bridges.

Ties of the above kind have many other applications, in particular for holding together electrical or optical cables, for example voice/data/image (VDI) cables.

Given their many applications in data transmission, VDI cables are increasingly widely used.

However, they have the major drawback of being fragile, and excessive compression when tightening the tie tends to damage them.

This is because the user has no way to assess the traction force that must be applied to the tie to hold the cables together without damaging them with the result that he usually overtightens the tie, assuming that its extensibility will suffice to absorb the excess force.

In fact this is not the case because, although it is extensible, the tie must have sufficient rigidity to hold the cables sufficiently securely for them not to knock against each other.

The traction force exerted on the strap is even more difficult to assess since the tie is usually fitted by means of a tool specifically designed for this purpose.

The invention aims in particular to eliminate the drawbacks previously cited by proposing a tie having some extensibility properties and which can be fitted around fragile components such as VDI cables both easily and without risk of damage thereto.

SUMMARY OF THE INVENTION

To this end, the invention proposes a tie including a strap having two end segments connected by an extensible intermediate portion provided with a succession of frangible bridges each connecting a first part of the portion to a second part of the portion, wherein two or more of the frangible bridges have different sections.

When the tie is tightened, three situations can arise: none of the bridges is broken, only one of them is broken, or both are broken.

Each of these situations provides an assessment of the traction force exerted on the strap when fitting the tie and tending to move the two segments of the strap apart.

Thus the frangible bridges with different sections together form a strain gauge enabling the user to secure the components to be gripped by the tie in a sufficiently rigid and stable manner whilst avoiding excessive compression likely to damage them.

The invention has a number of embodiments.

Accordingly, the intermediate portion includes a succession of extensible links connected two by two, for example.

In one embodiment each link has a central opening in which one or more frangible bridges extend longitudinally.

The bridge or each of the bridges is adapted to remain intact to maintain constant the longitudinal dimension of the opening if a traction force exerted on the strap and tending to move its segments away from each other has a value below a predetermined threshold value.

On the other hand, when the traction force exerted on the strap is greater than the threshold value, the bridge breaks and allows the corresponding link to expand longitudinally.

A single frangible bridge can extend in each central opening but a plurality of frangible bridges of equal section can instead extend longitudinally in each central opening.

The frangible bridges are cylindrical with a circular cross section, for example.

In one particular embodiment the successive frangible bridges have sections increasing from one of the segments toward the other.

For example, the tie further includes a head or buckle adjoining the first end segment and with which the second end segment is adapted to cooperate to close the tie and the sections of the frangible bridges increase from the second end segment toward the first end segment.

For example, the extensible portion includes a plurality of successive series each comprising two or more adjacent frangible bridges of equal section, the sections of the frangible bridges differing from one series to another.

For example, each series comprises three frangible bridges of equal section.

For example, the extensible portion includes first, second and third successive series of frangible bridges with respective circular sections having a diameter of 0.6 mm, 0.8 mm and 1 mm.

The successive frangible bridges can instead have sections increasing from one of the segments toward the other, so that it is possible to obtain a relatively accurate assessment of the traction force exerted on the strap when tightening the tie, according to the number of bridges that break.

Other features and advantages of the invention will become apparent in the light of the following description of one non-limiting and exemplary embodiment of the invention, which is described with reference to the accompanying drawings.

BRIEF DESCRIPTION OF THE DRAWINGS

FIG. 1 is a plan view of a tie according to the invention, shown when flat.

FIG. 2 is a view of the tie from FIG. 1 taken in section along the line II—II in that figure.

FIG. 3 is a view of the tie from FIG. 1 in section taken along the line III—III in that figure.

FIG. 4 is a perspective view of the tie from FIG. 1, shown when flat.

FIG. 5 is a perspective view showing a single link of the tie from the previous figures.

FIG. 6 is a perspective view of the link from FIG. 5 in section taken along the line VI—VI.

FIG. 8 is a plan view of the extensible portion of a different embodiment of a tie according to the invention.

DETAILED DESCRIPTION OF THE PREFERRED EMBODIMENTS

Figure 7:
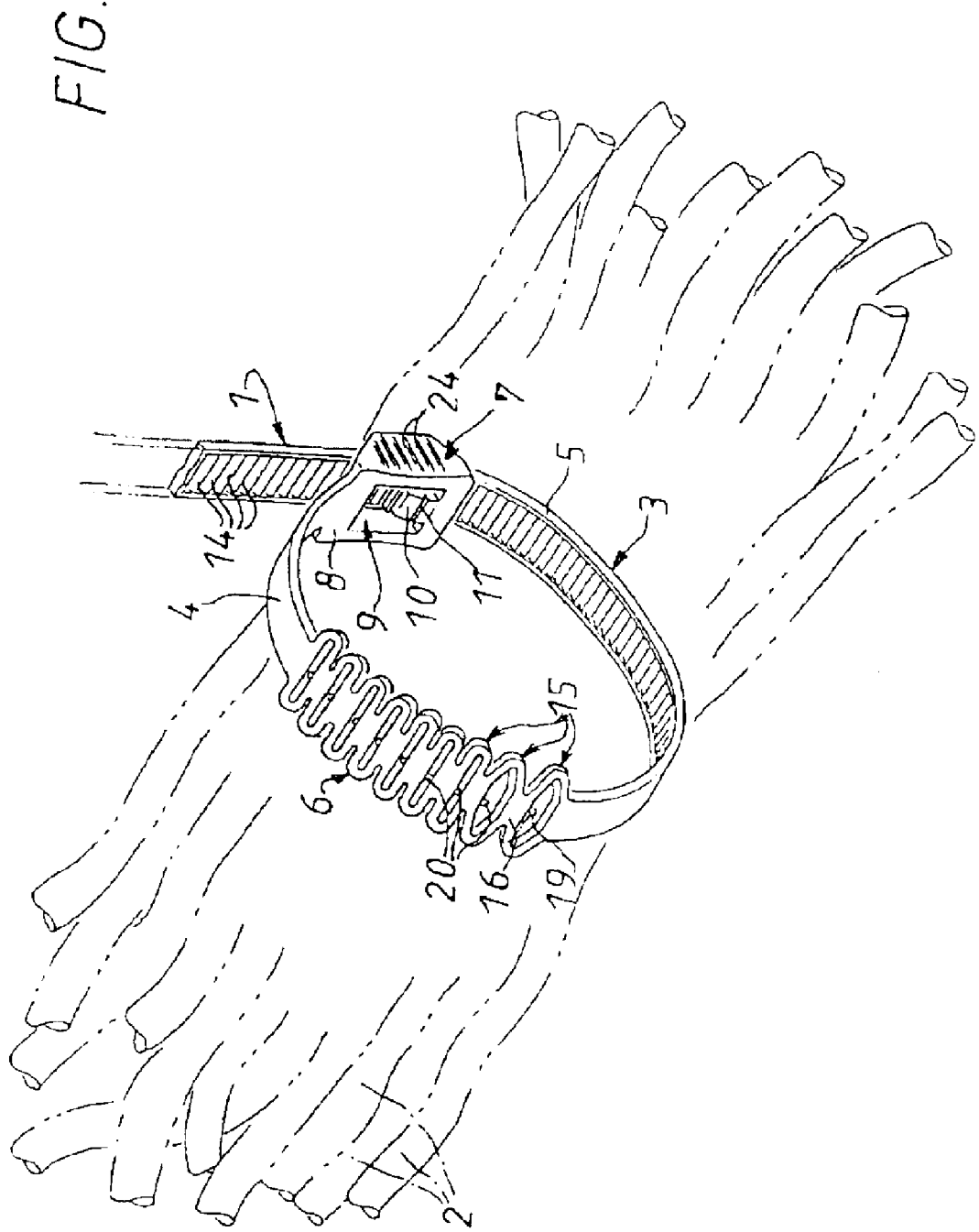
FIG. 7 is a perspective view of a tie according to the invention, shown when closed, gripping a plurality of cables shown in chain-dotted outline.

FIG. 1 shows a tie 1 adapted to grip a plurality of elongate components 2 to hold them together.

In this instance the components 2 are electrical or optical cables, in particular VDI cables, which are particularly fragile.

All portions of the one-piece tie 1, as described hereinafter, are made in one piece, in fact molded in one piece, since in this embodiment the tie 1 is formed by molding a synthetic material, preferably polyamide.

The tie 1 includes a strap 3 which, when relaxed (i.e. in the absence of any load), is rectilinear and thus defines a longitudinal direction.

The strap 3 has a first end segment 4 and a second end segment 5 connected by an extensible intermediate portion 6.

The tie 1 further includes, at the end of the strap 3, and on the other side of the first segment 4 from the intermediate portion 6, a closure head or buckle 7 whose function will become apparent hereinafter.

Accordingly, the tie 1 includes, in succession: the buckle 7, the first end segment 4, which adjoins the buckle, the intermediate portion 6, which adjoins the first end segment 4, and the second end segment 5, which adjoins the intermediate portion 6.

As can be seen in FIGS. 1 to 4, the strap 3 is generally flat so that, when relaxed, it lies in a plane P which in FIG. 1 is the plane of the drawing.

The strap 3 has some flexibility in a longitudinal plane P' perpendicular to the plane P defined above, so that it is possible to loop it on itself to close the tie 1 by inserting the second end segment 5 into the buckle 7, as shown in FIG. 7.

As shown in FIGS. 1 and 2 in particular, the buckle 7 includes a peripheral frame 8 with a substantially rectangular profile and a central opening 9 into which projects a non-return pawl 10 projecting longitudinally from the frame 8 in the direction of the strap 3 and joined to the frame by a thinner area 11 that forms an articulation enabling the pawl 10 to pivot in the opening 9 parallel to the plane P'.

The pawl 10 has teeth 12 which, when relaxed, encroach on an open-ended passage 13 that extends longitudinally through the frame 8.

The second end segment 5 has a succession of notches 14 which, when the segment 5 is introduced into the passage 13, interengage with the teeth 12 which, unless the pawl 10 is moved away from the segment 5, prevent the removal of the latter from the buckle 7.

As a result, closure of the tie 1 is irreversible, and to separate it from the objects 2 that it grips, it will be sufficient to cut it using a sharp tool.

Nevertheless, the extensibility of the intermediate portion 6 compensates this irreversibility and prevents excessive compression of the gripped objects, as described hereinafter.

The intermediate portion 6 includes a succession of buttonhole-shaped links 15 joined two by two by a substantially rigid tongue 16 in their middle portion.

Each link 15 has two facing transverse walls 17, 18 connected at their ends so that an oblong central opening 19 is defined between them.

The central opening 19 is crossed longitudinally by a frangible bridge 20 which connects the walls 17, 18 and, in the absence of any force, maintains constant the width of the opening 19, i.e. the separation between the walls 17, 18.

A traction force exerted on the tie 1 tends to move the end segments 4, 5 away from each other, as when the tie 1 is clamped around a set of cables 2 (FIG. 7).

If the traction force is below a predetermined threshold value that depends on the cross section of the frangible bridge 20, the bridge remains intact (i.e. in one piece) and maintains constant the separation between the walls 17, 18 of the corresponding link 20.

On the other hand, if the traction force exceeds said threshold value, the bridge 20 breaks, enabling the walls 17, 18 to move apart and thus allowing longitudinal expansion of the link 15, which allows some relaxation of the tie 1 around the cables 2.

However, because of the material from which the tie 1 is made, each link 15 has some elasticity and so the tie continues to exert some compression force on the cables 2.

According to the invention, two or more of the frangible bridges 20 have different sections. In this context, the term "section" refers to the surface area of the cross section of the bridge 20.

Given this difference in section, there is a predetermined first threshold value F1 for the smaller section bridge 20 and a predetermined second threshold value F2, greater than the first value F1, for the larger section bridge 20.

As a result, if the traction force exerted on the tie 1 does not break any of the bridges 20, this indicates that the value F of that force is less than the first threshold value F1.

If the traction force breaks the smaller section frangible bridge 20 without breaking the larger section frangible bridge 20, this indicates that the value F of the force is between the two threshold values F1 and F2.

Finally, if the traction force exerted on the tie 1 causes the different section frangible bridges 20 to break, this indicates that the value F of the force is greater than the higher threshold value F2.

Together, the frangible bridges 20 with different sections therefore form a strain gauge providing an assessment of the traction force exerted on the tie 1, so that excessive compression of the objects 2 to be gripped can be avoided.

In the particular embodiment shown in the figures, the extensible portion 6 includes a succession of frangible bridges 20 whose sections increase in the longitudinal direction, in this instance from the bridge 20 nearest the second end segment 5 toward the bridge 20 nearest the first end segment 4.

In this embodiment, this succession of frangible bridges 20 consists of a first series 21 of three successive bridges 20a in the vicinity of the second end segment 5 and each having the same small section, to which corresponds a low first threshold value F1.

The first series 21 of frangible bridges 20a is succeeded, in the direction of the first end segment 4, by a second series 22 of three frangible bridges 20b, each having the same medium section, which is larger than the small section, and to which there corresponds a medium threshold value F2 which is greater than the lower threshold value F1.

The second series 22 of frangible bridges 20b is succeeded, in the direction of the first end segment 4, by a third series 23 of frangible bridges 20c, each having the same large section, which is larger than the medium section, and to which there corresponds a high threshold value F3 which is greater than the medium threshold value F2.

It is therefore possible to obtain a relatively accurate assessment of the traction force exerted on the tie 1 when it is tightened, according to whether the bridges 20a, 20b, 20c of each series 21, 22, 23 are intact or broken.

Thus, the value F of the traction force is:

less than the low threshold value F1 if all the bridges 20a, 20b, 20c are intact, between the low threshold value F1 and the medium threshold value F2 if at least one of the bridges 20*a* of the first series 21 is broken but those 20*b*, 20*c* of the second and third series 22, 23 are intact, and between the medium threshold value F2 and the high threshold value F3 if at least one of the frangible bridges 20*b* of the second series 22 is broken but the bridges 20*c* of the third series 23 are intact.

The user must take care not to break all of the large section bridges 20*c*, which would indicate that the traction force exerted on the tie 1 had exceeded the high threshold value 3, although it is not possible to obtain an assessment of force in this situation.

Of course, the dimensions of the frangible bridges 20 are chosen so that the corresponding threshold values F1, F2, F3 are less than the value of a traction force likely to damage the objects 2 to be gripped.

That traction force can be assessed by appropriate tests.

Tests have established satisfactory choices for the production of a tie 1 specifically intended to grip VDI cables. Those choices are summarized in the table below, for cylindrical frangible bridges 20 having a circular cross section.

| Tie material | PA 12 or PA 6.6 polyamide |
|---|---|
| Small section diameter | 0.6 mm |
| Medium section diameter | 0.8 mm |
| Large section diameter | 1 mm |

The strain gauge formed by all of the frangible bridges 20 thus provides a visual, audible and tactile indication of the traction force exerted on the tie 1.

This is because the user can not only see but also hear the frangible bridges 20 break, and feel it when the tie 1 snaps.

Of course, when a frangible bridge 20 breaks, the corresponding link 15 expands longitudinally, with the result that the tie 1 expands, the elasticity of the link 15 then allowing automatic adjustment of the tie 1 around the gripped components 2.

It is possible to fit and tighten the tie 1 by hand, and this is facilitated by the ergonomic shape of the buckle 7 and the optional provision of non-slip ribs 24 on its flanks.

However, the tie 1 can also be tightened using a tool (not shown) specifically designed for this purpose. A conventional tool, such as that described in published French patent application FR-2 400 995, is perfectly suitable for tightening the tie 1 that has just been described.

Diverse variants of a tie 1 according to the invention can be envisaged.

In particular, the number of bridges in each series of frangible bridges as described above can be varied. Thus, although each of the series described above comprises three frangible bridges of the same section, it is possible to provide series including two bridges of the same section, or four or more bridges.

A plurality of frangible bridges can be provided in the same link 15, in particular to increase the threshold value corresponding to the link 15 concerned.

For example, the link can include two or even three parallel cylindrical frangible bridges crossing its central opening in the longitudinal direction, the link expanding when all three bridges have broken.

The successive frangible bridges can also all have different sections. Thus in one particularly advantageous embodiment, shown in FIG. 8, the section of the frangible bridges increases from one end segment toward the other, preferably from the second end segment toward the first.

It is therefore possible to obtain, according to the number of bridges that have broken, a relatively accurate approximate assessment of the value of the traction force exerted on the tie 1 when tightening it, since that value is known to be between the threshold value corresponding to the last bridge that has broken and the threshold value corresponding to the immediately adjacent intact bridge.

Of course, the invention is not limited to the embodiments that have just been described.

What is claimed is:

1. A tie including a strap having two end segments connected by an extensible intermediate portion having a succession of extensible links connected together, each link comprises at least one frangible bridge connecting a first part of said link to a second part of said link, wherein at least one of said frangible bridges has a different section than another of said frangible bridges in another link.

2. The tie claimed in claim 1 wherein each link has a central opening in which one or more frangible bridges extend longitudinally, said bridge or each of said bridges being adapted to remain intact to maintain constant the longitudinal dimension of said opening if a traction force exerted on said strap and tending to move its segments away from each other has a value below a predetermined threshold value.

3. The tie claimed in claim 2 wherein a plurality of frangible bridges of equal section extend longitudinally in each central opening.

4. The tie claimed in claim 1 wherein said frangible bridges are cylindrical with a circular cross section.

5. A tie including a strap having two end segments connected by an extensible intermediate portion including a succession of extensible links, each link is provided with at least one frangible bridge connecting a first part of said link to a second part of said link wherein said frangible bridges have increasing sections as they progress from one of said segments toward the other.

6. The tie claimed in claim 5, further including a head adjoining said first end segment and with which said second end segment is adapted to cooperate to close said tie, wherein said sections of said frangible bridges increase from said second end segment toward said first end segment.

7. The tie claimed in claim 5 wherein said extensible portion includes a plurality of successive series each comprising two or more adjacent frangible bridges of equal section, the sections of said frangible bridges differing from one series to another.

8. The tie claimed in claim 7 wherein each series comprises three frangible bridges of equal section.

9. The tie claimed in claim 7 wherein said extensible portion includes first, second and third successive series of frangible bridges with respective circular sections having a diameter of 0.6 mm, 0.8 mm and 1 mm.

10. The tie claimed in claim 9, wherein said frangible bridges have sections increasing from one of said segments toward the other.

11. A tie comprising:
a strap having two end segments connected by an extensible intermediate portion,
said intermediate portion having plural expandable links and plural frangible bridges, each of said expandable links being held in an unexpanded position by a respective one of said plural frangible bridges, each of said frangible bridges having a frangible part that ruptures upon application of a tensile force, and wherein at least two of said frangible bridges have different sections at said frangible part so as to rupture at different tensile forces.

12. The tie of claim 11, wherein each of said expandable links comprises a pair of legs that are transverse to a longitudinal axis of the tie, and wherein each of said frangible bridges joins a respective one of said pair of legs along the longitudinal axis.

13. The tie of claim 11, comprising plural sets of plural said frangible bridges, wherein each of said sets has a different tensile force at which said frangible part ruptures.

14. The tie of claim 11, further comprising a head adjoining a first one of said end segments and with which a second one of said end segments is adapted to cooperate to close the tie, and wherein said sections of said frangible parts increase from said second end segment toward said first end segment.

15. The tie of claim 1, comprising plural pairs of a first one of said frangible bridges and a second one of said frangible bridges, wherein for each said pair said first frangible bridge has a larger section than said second frangible bridge and wherein said first frangible bridge is closer to a first one of said end segments than to a second one of said end segments.

16. The tie of claim 1, wherein said extensible intermediate portion comprises plural loops that are joined to each other at their exterior sides, and wherein each of said frangible bridges connects opposing interior sides of a different respective one of said loops.

17. The tie of claim 11, wherein said expandable links comprise plural loops that are joined to each other at their exterior sides, and wherein each of said frangible bridges connects opposing interior sides of a different respective one of said loops.

18. The tie of claim 5, wherein said extensible intermediate portion comprises plural loops that are joined to each other at their exterior sides, and wherein each of said frangible bridges connects opposing interior sides of a different respective one of said loops.

* * * * *